Patented Apr. 30, 1929.

1,711,095

UNITED STATES PATENT OFFICE.

GUSTAV A. KLIMEK, OF EAST RUTHERFORD, NEW JERSEY, ASSIGNOR TO TURBINE PATENTS CORPORATION, OF NEW YORK, N. Y., A CORPORATION OF DELAWARE.

POWER-TRANSMITTING MECHANISM.

Application filed January 11, 1926. Serial No. 80,432.

This invention relates to certain improvements in power transmitting mechanism and has for its main object the provision of a hydraulic power transmitter or fluid clutch so combined and connected with the other elements of the mechanism as to give efficient power transmission, and at the same time the desired cushioning or shock-absorbing action.

Although my invention in its preferred form is particularly adapted for use in a motor vehicle for transmitting power from the engine to the main propeller shaft, it is equally applicable in various other apparatus, machines and power plants for the transmission of power from a driving to a driven shaft, and particularly where either shaft is liable to be subjected to sudden speed variations.

For practical purposes in a transmission mechanism particularly for automobiles, there must be a mechanical clutch in the unit so disposed and connected that when disengaged, the driving shaft may be operated at any desired speed without imparting driving torque to the driven shaft. It is well recognized that by transmitting power through a hydraulic power transmitter or fluid clutch of the type in which kinetic energy is transmitted to a turbine rotor from a centrifugal impeller, smoother operation is secured, wear is reduced, and consequent increase in the life of both engine and running gear is secured because the shocks, strains, and irregularities of operation of each are cushioned and absorbed so that they are not transmitted to the other.

It has been proposed to use a mechanical clutch and a fluid clutch in parallel, but this is not satisfactory except for starting, because the fluid clutch ceases to function when the mechanical clutch is engaged. Furthermore, the fluid clutch must permit such slippage that the engine can idle without turning the driven shaft.

It has been proposed to use the fluid clutch and mechanical clutch in series, but this necessitates making the fluid clutch of such size and capacity that it can effectively transmit the maximum loads at the maximum speeds, and still operate satisfactorily with light loads and low speed. This involves difficulties which are not easily overcome. Various combinations of fluid clutches with planetary gears, and with or without mechanical clutches have been proposed, but none, so far as I know, has proven practical or satisfactory.

In my improved construction I provide a planetary gear in which the pinion carrying member is secured to one shaft, while both of the gears which mesh with the pinions are connected to the other shaft. By interposing a fluid clutch between one planetary gear member and its shaft, and a mechanical clutch between the other planetary gear member and said shaft, the two clutches are in parallel, so that each serves for carrying a portion of the load. Thus the fluid clutch may be made very much lighter, smaller and of less capacity than would be the case if it under any circumstances were called upon to carry the entire load. With the mechanical clutch disengaged, there will be no transmission of power, while when the mechanical clutch is engaged, a portion of the power will be transmitted to one planetary gear member through the mechanical clutch, and a portion to the other planetary gear member through the hydraulic clutch. Due to the slippage between the two members of the fluid clutch, and the absence of any mechanical connection between said members, the two gear members of the planetary gear may have relative rotation in respect to each other, and no sudden shocks or load strains imparted to either shaft will be transmitted to the other. Any slippage or difference in rotational speeds of the two members of the fluid clutch will cause only one half as much slippage or difference in rotational speeds of the driving and driven shafts.

As a further important feature, the mechanical clutch, fluid clutch and planetary gear, are so designed as to occupy the minimum space, and to permit of convenient housing in the chamber of a fly-wheel.

The invention involves various other important features and structural details, and arrangement of parts which will be apparent from a consideration of the preferred embodiment shown in the accompanying drawings, or will be pointed out in the following description.

Figure 1:
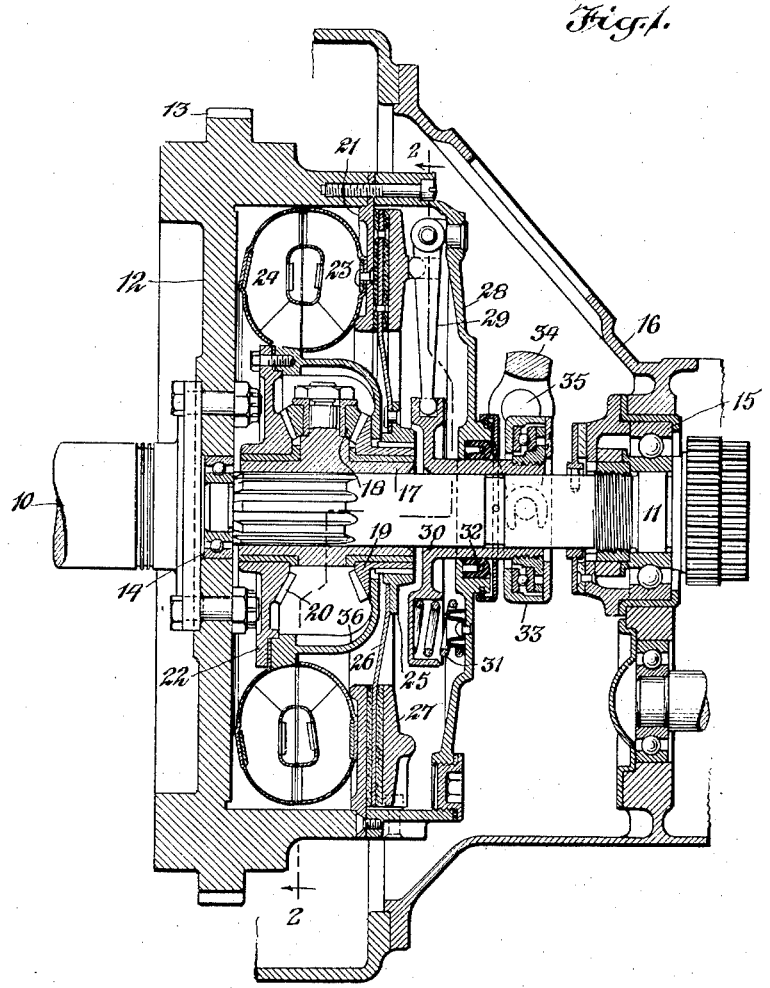
Fig. 1 is a central longitudinal section.

My improved device is intended for the transmission of power between a driving element and a driven element which are preferably two shafts in axial alignment. Although either shaft may be used for the delivery of the power to be transmitted, the construction illustrated is primarily intended for use as a part of an automobile transmission in which the shaft 10 is the driving shaft and is coupled to or forms the end of the crank shaft of the engine. The shaft 11 is the driven shaft, and may be connected through a universal joint to the propeller shaft or may merely extend to the usual gear shifting speed changing and reversing mechanism.

The driving shaft 10 has secured thereto a flywheel 12 which may be provided with the usual peripheral gear 13 for engagement with an engine starter, and which may have a chamber therein for housing the important parts embodying my invention. The driven shaft 11 projects into this chamber in alignment with the driving shaft, and may be supported by ball bearings 14 at the end of the driving shaft or in the end wall of the flywheel chamber, and in ball bearings 15 in a stationary casing 16 which is rigidly secured to the engine.

Within the chamber of the flywheel the driven shaft is provided with a planetary gear which is preferably of the type commonly employed in the differential gearing of the automobile. This planetary gearing includes a sleeve 17 constituting a pinion carrier, and having radially disposed stud shafts upon which are rotatably mounted the pinions 18. These pinions each mesh with a pair of ring gears 19 and 20 which are integral with or connected to sleeves or bearing portions rotatably mounted upon the sleeve 17. The sleeve 17 is held against rotation in respect to the shaft 11, but may have slight, axial movement in respect thereto by reason of interengaging longitudinally extending flanges and grooves. It will be apparent that if the two gears 19 and 20 are rotated in the same direction and at the same speed, their engagement with the pinions 18 will cause a simultaneous and equal rotation of the shaft 11. Also, if either of the gears 19 or 20 be free and the other driven, no power will be transmitted to the shaft 11 as the pinions may rotate and cause equal and opposite rotation of the gears 19 and 20 while the shaft 11 remains stationary.

In my improved construction I provide a fluid clutch or hydraulic gear for transmitting power from the flywheel to one of the gears, namely a gear 20, and a mechanical clutch for transmitting power from the flywheel to the other gear, namely the gear 19. As illustrated, the flywheel has an inwardly extending flange or wall 21 secured to one end of the peripheral wall, and the gear 20 has an outwardly extending annular flange or wall 22. These are spaced axially and are connected by the fluid clutch. The clutch is of the type in which there is employed a centrifugal liquid impeller and a turbine rotor, the two being so juxtaposed that fluid is caused to circulate from the outlet of each to the inlet of the other, and the turbine rotor thus is not mechanically connected to the impeller but is caused to rotate by the action of the liquid in the chamber formed by or including these two parts. The fluid clutch illustrated is of the type disclosed and broadly claimed in the Föttinger Patent 1,199,359, issued September 26th, 1916, and includes a centrifugal pump impeller 23 secured to the flange 21 of the driving member, and a turbine rotor 24 secured to the flange 22 of the differential ring gear 20. It will of course be understood that the space within each of these two members is subdivided by blades or vanes, so that as the member 23 is rotated, liquid is forced therefrom into the passages or against the vanes or blades of the member 24.

Figure 2:
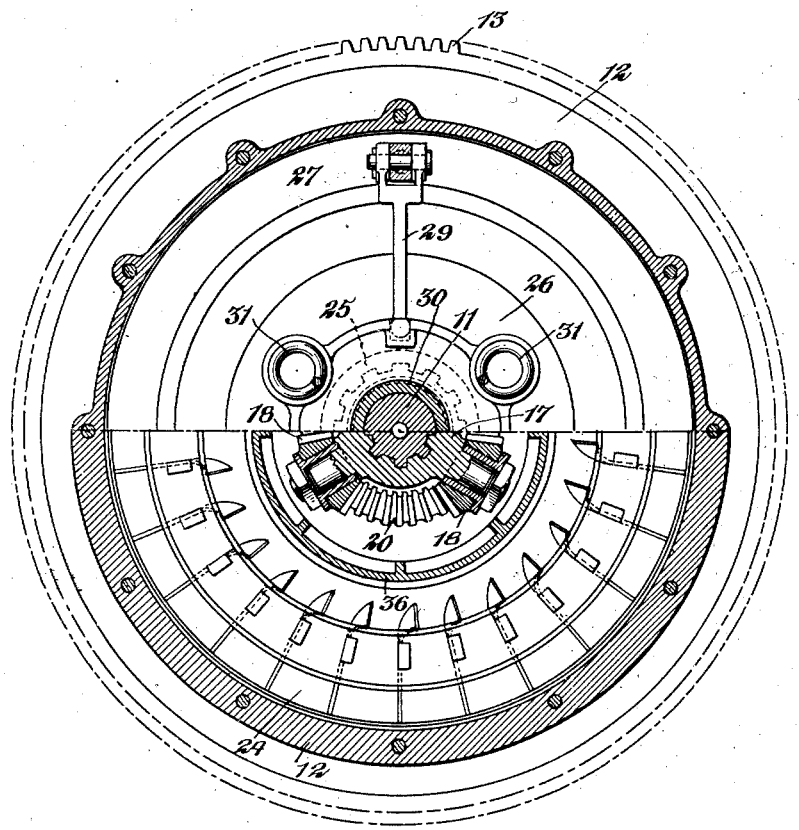
Fig. 2 is a transverse section on a broken plane indicated by the line 2—2 of Fig. 1.

The other ring gear 19 is connected to the flywheel by means of a mechanical clutch. The sleeve or bearing portion of the gear 19 is provided with a flange 25 corresponding to the flange 22 of the other ring gear, but preferably so connected as to permit limited axial movement in respect to the gear. As shown in dotted lines in Fig. 2, the two have interengaging, longitudinally extending grooves and flanges. The flange 25 is secured to a disk 26 which is preferably slightly flexible, but of sufficient thickness and strength to adequately resist distortion under torsional strains. The peripheral portion of this disk is so positioned and so constructed that it may be clamped to the outer side of the flange 21 of the flywheel. As shown, the disk 26 is provided with annular layers of anti-friction material such as is commonly employed for brake linings, and lies parallel to the surface of the flange 21. Spaced from this flange and upon the opposite side of the disk 26, is an annular clamping plate 27 which is non-rotatable in respect to the flywheel, but capable of limited axial movement. By forcing the clamping plate 27 toward the flange 21 the disk 26 may be gripped therebetween, so that it will act to positively transmit power from the flywheel to the ring gear 19. The flange 21, the outer portion of the disk 26, and the annular plate or ring 27, constitute the three plates of the mechanical clutch.

Although within the scope of my invention as broadly considered, any suitable means may be employed for operating the movable clutch member 27, I preferably employ mechanism whereby the minimum force is required for clamping the clutch members with the maximum necessary pressure. As shown, the flywheel has an outer end wall or plate member 28 to which are pivotally connected a plurality of radially disposed inwardly extending levers 29. These levers, adjacent to their outer or fulcrum ends, engage with the clutch member 27, while at their inner ends they engage in recesses in a slidable clutch operating sleeve 30. Arranged between successive lever 29 are coil springs 31 which seat in pockets on the outer side of a flange on the inner end of the sleeve 30, and on the inner surface of the end wall 28 so as to normally exert force tending to swing the levers 29 and engage the mechanical clutch. Any suitable means may be employed for pulling the sleeve 30 outwardly to disengage the clutch. As shown, the clutch operating sleeve 30 extends through a packing 32 in the end wall 28, and at its outer end carries a collar 33. Between the collar and the adjacent portion of the sleeve there is a suitable thrust bearing and the collar has trunnions upon opposite sides, as shown in dotted lines in Fig. 1, for engaging the forked ends of a clutch operating lever 34 fulcrumed at 35.

The planetary gearing and the fluid and mechanical clutches are enclosed in a casing formed by the flywheel and its end wall 28. This casing is substantially liquid-tight so that the liquid employed in the fluid clutch cannot escape. The planetary gearing preferably operates in a section of the casing which is separated from the space occupied by the other parts. As shown, the flange 22 which connects the ring gear 20 with the rotor 24 also carries an annular wall 36 which extends axially across the planetary gearing and is provided with an inwardly extending flange engaging the outer side of the ring gear 19. This annular wall forms a housing for the gears, and the edge portion or flange thereof forms a thrust collar to prevent endwise movement of the gear 19 away from the pinions 18.

It will be noted that the mechanical clutch is of the maximum permissible diameter so that the member 26 is gripped at the maximum distance from the center of rotation, and a narrow annular surface provides adequate clutch surface. The fluid clutch is also of the maximum permissible diameter so that centrifugal force acts most efficiently on the enclosed liquid and there is the maximum slippage even at low speeds. Both of these clutches are enclosed in the flywheel and encircle the planetary gearing so that the device as a unit may be so designed and proportioned that it may be installed in place of the ordinary flywheel and clutch of an automobile by merely removing those parts without change in construction or positioning of the other parts.

As will be evident from the scope of the appended claims, various other changes in the details of construction may be made without departing from the spirit of my invention.

Having thus described my invention, what I claim as new and desire to secure by Letters Patent is:—

1. A power transmitter including a driven shaft, a driving shaft, a planetary gearing including a pinion carrier secured to one of said shafts, a bevel pinion on said carrier and having its axis radial to said shafts, a pair of axially spaced bevel gears of the same diameter meshing with said pinion, a fluid clutch between one of said gears and the other shaft, and a mechanical clutch between the other gear and said last mentioned shaft.

2. A power transmitter including a planetary gearing having a driving shaft, a driven shaft, a casing connected to one of said shafts, a pinion carrier within said casing and connected to the other shaft, a pinion on said carrier and having its axis radial to said shafts, a pair of bevel gears of equal diameter, axially spaced and meshing with said pinion, a fluid clutch encircling one gear and having one part connected thereto, and the other part connected to said casing, and a mechanical clutch encircling the other gear and having one part connected thereto, and the other part connected to said casing.

3. A power transmitter including a flywheel having a chamber therein, a shaft projecting into said chamber, a pinion, a pinion carrier within said chamber and secured to said shaft, a pair of ring gears, meshing with said pinion and means for transmitting power from said flywheel to both of said gears, and permitting relative rotation of said gears, and including a fluid clutch and a mechanical clutch.

4. A flywheel having a chamber therein, a shaft projecting into said chamber, a planetary gearing within the chamber and including three relatively rotatable members, one of said members being connected to said shaft, a fluid clutch for transmitting power from said flywheel to a second one of said elements of said planetary gearing, a mechanical clutch for transmitting power from said flywheel to the third element of said planetary gearing, a sleeve slidable upon said shaft, said chamber having an end wall through which said sleeve is axially movable, and levers fulcrumed on said end wall and operatively connected to said sleeve for actuating said mechanical clutch.

5. A power transmitter including a casing having an end wall and an inwardly extending flange within the casing, a shaft projecting into said casing, a planetary gearing having one element connected to said shaft, a fluid clutch at one side of said flange for operatively connecting said flange and another element of said gearing, and a mechanical clutch upon the opposite side of said flange for operatively connecting said flange and another element of said mechanical gearing.

6. A power transmitter including a casing having an inwardly directed flange therein, presenting a mechanical clutch surface, a planetary gearing within the casing and including three elements, a disk secured to one of said elements and having its outer annular portion disposed adjacent to said flange, manually operable means for clamping said disk to said flange, a fluid clutch for transmitting power from said casing to another of said elements, and a shaft projecting into said casing and secured to the third element.

7. A power transmitter including a casing, a shaft projecting into said casing, a planetary gearing having an element secured to said shaft, a fluid clutch for transmitting power from said casing to another element of said gearing, and a mechanical clutch including a pair of annular members within the casing and relatively movable axially, and a disk adapted to be clamped between said members and having its inner edge secured to the third element of said planetary gearing.

8. A power transmitter including a rotatable casing, a shaft extending thereinto, a pair of annular members disposed in said casing and relatively movable axially thereof, a disk having its peripheral portion disposed between said members, a sleeve movable axially of said shaft, operative connections between said sleeve and one of said members for moving the latter to grip or release said disk, and a planetary gearing and a fluid clutch operating in combination for transmitting power from said disk to said shaft.

9. A power transmitter including a rotatable casing, a shaft extending into said casing, a pair of annular members within the casing adjacent to the periphery thereof, one of said members being axially movable, a lever extending radially of said shaft, and having one end pivoted to said casing and an intermediate portion engaging with one of said members, a member movable in a direction parallel to the axis of the shaft for operating said lever, a disk having its peripheral portion disposed between said members and adapted to be clamped thereto upon said relative movement of said members, and a planetary gearing and a fluid clutch operating in combination for operatively connecting said disk to said shaft.

Signed at New York in the county of New York and State of New York this 9th day of January, A. D. 1926.

GUSTAV A. KLIMEK.